United States Patent
Kavolik, Jr.

(10) Patent No.: US 7,490,816 B2
(45) Date of Patent: Feb. 17, 2009

(54) SPHERICAL HEAT AND MASS TRANSFER MEDIA

(75) Inventor: Joseph R. Kavolik, Jr., Dellroy, OH (US)

(73) Assignee: Koch Knight LLC, East Canton, OH (US)

( * ) Notice: Subject to any disclaimer, the term of this patent is extended or adjusted under 35 U.S.C. 154(b) by 561 days.

(21) Appl. No.: 11/346,843

(22) Filed: Feb. 3, 2006

(65) Prior Publication Data

US 2007/0182035 A1    Aug. 9, 2007

(51) Int. Cl.
*B01F 3/04*    (2006.01)
(52) U.S. Cl. .................... 261/94; 261/DIG. 72
(58) Field of Classification Search .............. 261/94, 261/95, DIG. 72
See application file for complete search history.

(56) References Cited

U.S. PATENT DOCUMENTS

| | | | | | |
|---|---|---|---|---|---|
| 2,183,657 | A | * | 12/1939 | Page | 261/95 |
| D232,174 | S | * | 7/1974 | La Borde | D23/209 |
| D232,236 | S | * | 7/1974 | La Borde | D23/209 |
| D232,237 | S | * | 7/1974 | La Borde | D23/209 |
| 4,113,810 | A | * | 9/1978 | Ikawa | 261/98 |
| 4,581,299 | A | * | 4/1986 | Jager | 428/542.8 |
| 4,842,920 | A | * | 6/1989 | Banai et al. | 428/184 |
| 6,852,227 | B1 | * | 2/2005 | Petrone | 210/616 |

* cited by examiner

*Primary Examiner*—Scott Bushey
(74) *Attorney, Agent, or Firm*—J. David Wharton; Stinson Morrison Hecker LLP

(57) ABSTRACT

An improved random packing is the subject of the present invention. The packing element comprises a generally spherically shaped member which can be a perfect sphere, an ellipse, or some variation on either of the foregoing. The sphere is a hollow body having inner and outer surfaces with a plurality of openings passing through the body. A hypothetical axis passing through the sphere defines circular openings at both ends and the openings in between these two ends are generally elongated. The solid walls which form the sphere are of sufficient thickness so as to accommodate a plurality of indentations, some of which are formed in the solid walls and other indentations being formed coincidentally with the elongated openings between the solid wall sections. The indentations are characterized by curvilinear surfaces so that the total surface area presented by the inner surface ($S_1$) and all of the remaining surfaces ($S_2$) are at least twice the area of solid sphere of the same diameter with no indentations.

11 Claims, 1 Drawing Sheet

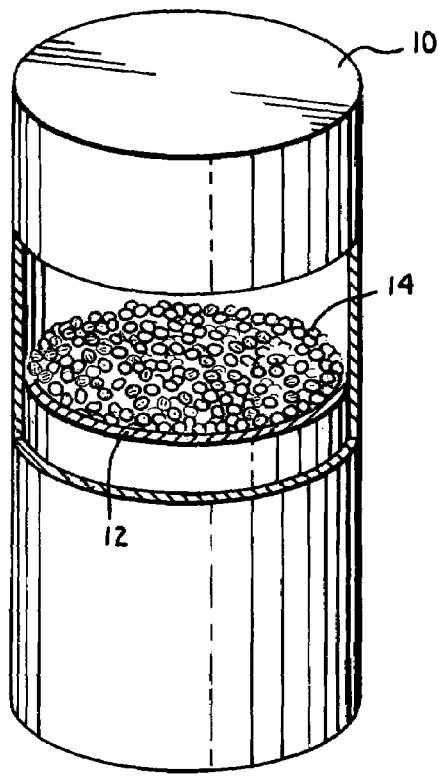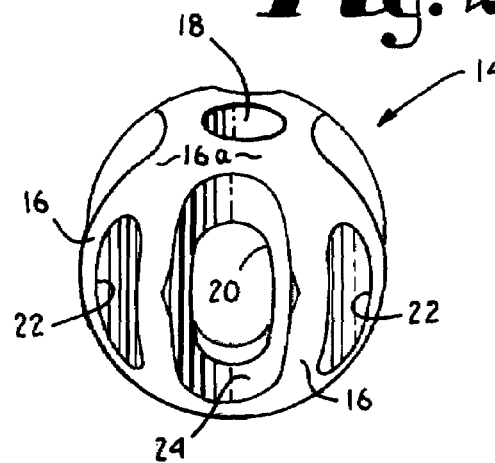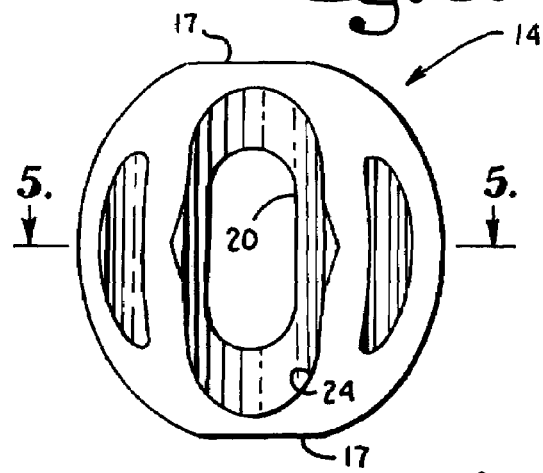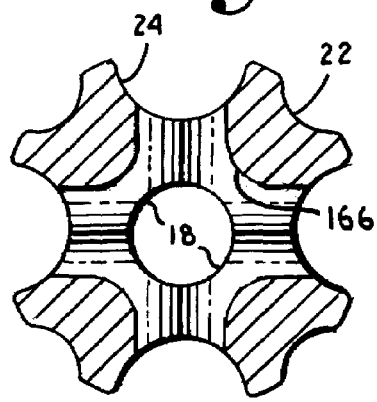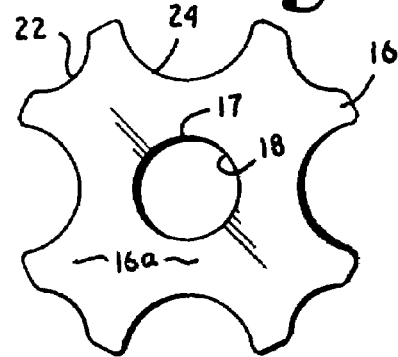

SPHERICAL HEAT AND MASS TRANSFER MEDIA

BACKGROUND OF THE INVENTION

1. Field of the Invention

This invention relates generally to packing structures for chemical processing and heat transfer equipment and, more particularly, to packing elements for use in randomly packed beds.

2. Description of Related Art

It is known to use packing in mass transfer towers as well as in heat sink applications. Packing provides increased surface area for exchanges between liquid and vapor phases as well as for heat transfer. Packing may take the form of a fixed structure, also referred to as structured packing, or may be random or dumped packing which is placed in a tower in a random manner on a supporting surface. Different chemical processes dictate what type of packing will be used along with considerations such as energy requirements for operating an exchange tower. Random packings of the type which are the subject of the present invention are advantageous from the standpoint of being very economical to manufacture and install.

Random packings have taken many different shapes and examples of the prior art are found in U.S. Pat. Nos. 578,548; 4,203,935; and 6,547,222.

The objective of nearly all random packings is to present the largest possible surface area for either heat exchange or mass transfer. It is also desirable, however, to maximize the free space in any particular volume of packing so as to minimize the pressure drop across the packed bed. "Free space" is defined as all of the space in a given volume that is not filled with solid material. Thus, free space encompasses the space between random packing elements as well as the space within a particular element. The objectives of maximizing surface area and free space must be accomplished while maintaining sufficient structural strength that the packing elements will not collapse even when confined in an area several meters deep.

It is known to make random packing from various types of metal, from plastic and from ceramics. Ceramic packings are employed in highly corrosive environments.

BRIEF SUMMARY OF THE INVENTION

The present invention is directed to a random packing of a generally spherical configuration which presents both increased surface area and increased free space over other known random packing configurations.

The present invention provides an improved random packing element for incorporation into a packed bed of a chemical process tower or a heat exchange media. The packing element comprises a generally spherical member having a plurality of openings to expose both inner and outer surface areas. The member is characterized by a thickness which accommodates a plurality of indentations in the outer surface which results in additional surface area which could not be achieved utilizing the shapes of conventional random packings. More particularly, by utilizing the generally spherical shape of a hollow member, by placing openings which extend through the member and by forming a plurality of indentations in the outer surface which are generally curvilinear in cross section, it has been found that the total surface area available for mass transfer is approximately 2.5 times the available surface area of a standard solid reference sphere of the same diameter. This compares which a surface area of less than 2 times that of a solid reference sphere for random "saddle" packings such as that shown in U.S. Pat. No. 6,547,222. The advantage over other random packing configurations of the prior art is even greater. This significant improvement in surface area is achieved with only minimal sacrifice of free space, generally a decrease of less than 4%.

The preferred form of the invention is a generally spherical shape, although a perfect sphere is not required. In some cases the packing will assume more of a generally elliptical configuration, but always characterized by having both inner and outer surfaces and a thickness which accommodates indentations in the outer surface. The indentations are, in some cases coincident with openings in the solid walls of the packing and in other cases the indentations are located in the solid portions of the walls.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

Referring to the single sheet of drawings, FIG. 1 is a perspective view of an exchange tower with portions broken away to disclose a tray supporting a plurality of packing elements according to the present invention;

FIG. 2 is a perspective view of a packing element incorporating the features of the present invention;

FIG. 3 is a side elevational view of the packing element shown in FIG. 2;

FIG. 4 is a top plan view of the packing element shown in FIG. 3; and

FIG. 5 is a horizontal cross-sectional view taken along line 5-5 of FIG. 3.

DETAILED DESCRIPTION OF PREFERRED EMBODIMENT

Referring initially to FIG. 1, a mass transfer tower 10, which is represented more or less schematically, is shown having a support tray 12 with a plurality of packing elements 14 stacked on the tray. The general principle of operation of tower 10 is that liquid is introduced at the top of the tower and proceeds downwardly under the influence of gravity and in the process passes through one or more beds of packing. At least one of the beds is comprised of the packing elements 14 as shown in the drawing. Vapor is introduced at the bottom of the tower and rises upwardly as liquid saturates the tower. As liquid enters the packing bed it spreads over the surface of the packing elements to enhance mass transfer between the liquid and vapor stages.

Details of packing element 14 are shown in FIGS. 2 through 5. Referring initially to FIG. 2, the generally spherically shaped element comprises a hollow member having a plurality of solid wall components 16. Each of the solid walls presents an outer surface 16a and an inner surface 16b (FIG. 5).

The sphere is also characterized by a plurality of circular openings 18 (FIGS. 2 and 5) which are aligned with a vertical rotational axis of the sphere as it is depicted in FIGS. 2 and 3. Openings in the sides of the sphere are generally elongated and are designated by the numeral 20. The thickness of walls 16 is sufficient to accommodate a plurality of indentations 22 as well as indentations 24 which are coincident with openings 20. Both indentations 22 and 24 are characterized by elongated curvilinear surfaces which extend parallel to an imaginary axis of the sphere passing through openings 18 as depicted in FIG. 2.

Referring to FIG. 3, packing element 14, while generally spherical in shape is a somewhat elongated sphere of a generally elliptical configuration. It is not a true ellipse, however. Ends 17 are flattened in the area surrounding openings 18 to present a generally planar surface immediately surrounding the opening.

In order to accomplish the objectives of the invention, it is necessary that the thickness of walls 16 be sufficient to accommodate indentations 22 and 24 so as to provide for increased surface area for the overall packing element. This thickness is determined so that the area presented by inner surface 16b, (also referred to as $S_1$) when combined with the total surface area 16a, which includes the surface area of indentations 22 and 24, (also referred to as $S_2$), creates a total surface area ($S_1$ & $S_2$) which is at least two times the surface area of a solid sphere of the same diameter with no indentations, and preferably about 2.5 times the surface area of such a hypothetical solid reference sphere. In the case of packing element 14, the free space (as previously defined) has been determined to be approximately 1.8 times the free space of a solid reference sphere of the same diameter. This compares favorably with a packing made in accordance with the teachings of U.S. Pat. No. 6,547,222 which has a free space of approximately 1.9 times that of a comparable solid reference sphere. Set forth below in Table I is data concerning density, surface area and free space for a 1.25 inch diameter solid reference sphere, for a packing element according to the present invention and for a packing element constructed according to the teachings of U.S. Pat. No. 6,547,222. Thus, the free space utilizing the packing elements 14 is preferably greater than 65% per volume and most preferably at least 69%.

TABLE 1

| | Density lbs/ft$^3$ | no. pieces per ft$^3$ | Surface Area per sq. ft/ft$^3$ | % free space |
|---|---|---|---|---|
| 1.25" solid reference sphere | 90.5 | 1047.6 | 35.7 | 38.0 |
| Improved Sphere Per Invention | 44.6 | 1734.8 | 88.7 | 69.4 |
| Packing Element Per U.S. Pat. No. 6,547,222 | 40.7 | 1386.6 | 69.1 | 73.1 |

The invention has been described with reference to a "generally spherically shaped member" and it is to be understood that this terminology encompasses spherical shapes, less than perfect spheres, ellipses, less than perfect ellipses, and other variations from a perfect sphere.

The preferred material for making the packing element 14 is a ceramic, although the principles of the invention are not limited to any particular material. The invention has achieved an improved random packing having significantly greater surface area than is possible using known random packings of the prior art. This increase in surface area is achieved while still maintaining optimum free space and sufficient structural strength so as to accommodate a relatively deep packed bed.

As previously discussed, the packing elements constructed according to the present invention are useful in both mass transfer and heat exchange applications.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A packing element for use in a heat exchange or mass transfer tower, said packing element comprising:
   a generally spherically shaped member having an inner surface ($S_1$) and an outer surface ($S_2$) and a plurality of openings extending through the member,
   said member having a thickness which accommodates a plurality of indentations in said outer surface ($S_2$) sufficient to create a total surface area ($S_1$ & $S_2$) which is at least twice the surface area of a solid sphere of the same diameter with no indentations.

2. A packing element as set forth in claim 1, wherein said member presents a plurality of solid walls between said openings, some of said indentations being located in said solid walls and some of said indentations being coincident with said openings.

3. A packing element as set forth in claim 1, wherein said member comprises a sphere.

4. A packing element as set forth in claim 1, wherein said member is generally elliptical and wherein said indentations extend in a direction parallel to the longitudinal axis of the ellipse.

5. A packing element as set forth in claim 1, wherein said indentations present a curvilinear surface.

6. A packing element as set forth in claim 5, wherein the free space per cubic foot utilizing said member is at least 50% greater than the free space obtained utilizing a solid member of the same dimension.

7. A packing element as set forth in claim 4, wherein at least two of said openings are aligned with the longitudinal axis of the ellipse.

8. A packing element as set forth in claim 6, wherein said member comprises a ceramic material.

9. A packing element as set forth in claim 1, wherein the total surface area of $S_1$ & $S_2$ is approximately 2.5 times the surface area of a solid sphere of the same diameter.

10. A packing element as set forth in claim 9, wherein the free space per given volume of packing is greater than 65%.

11. A packing element as set forth in claim 10, wherein the free space is at least 69%.

* * * * *